May 30, 1961  G. S. TARBOX  2,986,035
OUTSIDE THERMOMETER
Filed May 4, 1959
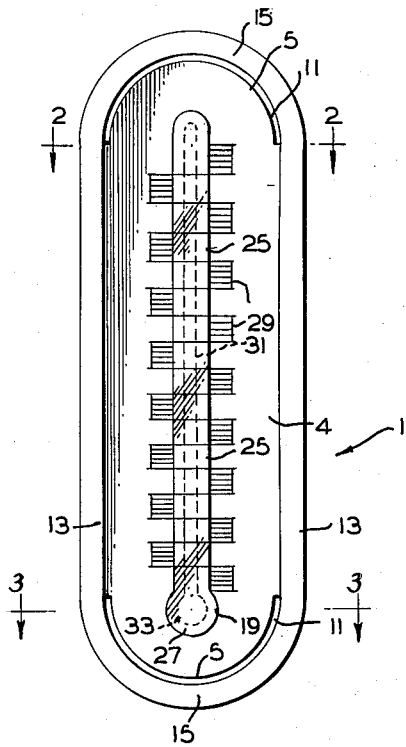
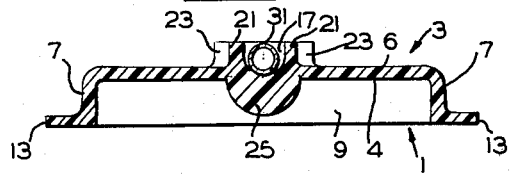
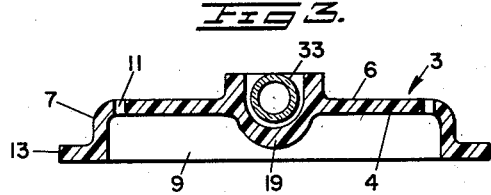
INVENTOR
George S. Tarbox
BY Peck & Peck
ATTORNEYS 000
United States Patent Office 2,986,035
Patented May 30, 1961

2,986,035

OUTSIDE THERMOMETER

George S. Tarbox, 808 Nepperhan Ave., Yonkers, N.Y.

Filed May 4, 1959, Ser. No. 810,874

3 Claims. (Cl. 73—376)

This invention relates broadly to the art of temperature measuring and indicating instruments and in its more specific aspects it relates to thermometers and mounting means therefor which are adapted to be mounted on the exterior of a building while being visible from the interior of the building for indicating the temperature of the outside air; and the nature and objects of the invention will be readily recognized and understood by those skilled in the arts to which it relates in the light of the following explanation and detailed description of the accompanying drawings illustrating what I at present believe to be the preferred embodiments or mechanical expressions of my inveniton from among various other forms, arrangements, combinations and constructions, of which the invention is capable within the spirit and scope thereof.

Many arrangements have been tried for mounting thermometers on the exterior of a building for reading from the inside so as to indicate the outside temperature. In some typical installations of this general character an opening is made in a windowpane so that the sensitive part of the instrument is on the exterior while the indicating part of the instrument extends through the opening in the pane and into the interior so that a reading may be taken by the person on the inside. Such mountings and arrangements are not entirely satisfactory for a variety of obvious reasons; for instance, it is objectionable to provide an opening in the glass window or doorpane, the mounting means for the thermometer is usually not simple and is not inexpensive and the accuracy of the thermometer in giving a true reading of the outside temperature is often impaired.

In other instances a more or less conventional thermometer may be provided with brackets for mounting on the frame of a window or other opening in a building. Such positioning of the thermometer at the side of the window or the like displaces it to such an extent that it is not clearly and fully visible for a direct reading from the inside. It is thus difficult for the person on the inside to get a true temperature reading from thermometers mounted in this manner.

The thermometer and the mounting therefor which I have devised overcomes the inherent undesirable characteristics of prior arrangements, such as those mentioned above and others which have heretofore been used.

It has been one of my major purposes to provide an outside thermometer and mounting therefor which is positioned directly on the exterior surface of a windowpane or other transparent closure for a building opening, so that it is in a direct line of sight to a viewer on the inside for a true and accurate reading of the outside temperature.

One of my further objects has been to provide an outside thermometer of simple construction so that it may be economically produced and is endowed with lasting qualities.

It has been my experience with prior outside thermometers that they often involve substantial mounting means and are not easy to assemble and install. The mounting means for the thermometer of my invention is unitary, requires no setting or manipulation prior to installation, and is merely cemented, or otherwise fastened to the exterior surface of the transparent closure for the building opening. No nails, screws or the like are required, and no opening is made in the transparent closure. A further and substantial advantage of this invention resides in the construction whereby there are no moving parts in the mounting means to assemble, set or adjust, for I have designed a unitary structure of sturdy construction.

This invention includes air circulating means which insures against the thermometer being influenced by the inside or room temperature so that an accurate measurement of the outside temperature would not be given.

In order to provide for clear and easy reading of the thermometer I have provided magnifying means for the thermometer tube. I have provided a magnifying means which is unique in the combination, for the construction, design and arrangement of the invention permits the mounting means, including the magnifying lens, to be molded in one operation with all the components thereof being formed as an integral unit which provides receiving and mounting means for the thermometer tube. It will be appreciated that such construction produces substantial economies in production and reduces assembly time and complexity and, as will become apparent hereinafter, simplifies the mounting of the instrument on a transparent closure for a building opening.

With the foregoing general objects, features and results in view, as well as certain others which will be apparent from the following explanation, the invention consists in certain novel features in design, construction, mounting and combination of elements, as will be more fully and particularly referred to and specified hereinafter.

In the accompanying drawings:

Fig. 1 is a view in elevation of the front or operative face of the thermometer.

Fig. 2 is a view taken on line 2—2 of Fig. 1.

Fig. 3 is a view taken on line 3—3 of Fig. 1.

In the accompanying drawings I have used the numeral 1 to designate in its entirety the means for mounting the outside thermometer on the exterior surface of a transparent closure for a building opening, all as will be explained in detail hereinafter. The mounting means is preferably formed of any suitable transparent plastic material and may be molded as an integral unitary structure, and includes an elongated body or base portion designated generally by the numeral 3 having a front face 4 and a rear face 6. The elongated body or base portion 3 is preferably, though not necessarily, formed with curved ends 5. The elongated body or base portion 3 is molded or otherwise formed with a rim or wall 7 extending forwardly along each longitudinal edge thereof, the rim being extended about each curved end 5 of the body portion as at 9 in spaced relation to each curved end 5 to provide a space between each rim and curved end in the nature of a curved slot 11. I form on each of the rims 7 and 9, outwardly extending supporting flanges 13 and 15, respectively, the purpose of which will become apparent as this description of my invention proceeds.

The base or body portion 3 of the thermometer mounting means is molded to provide a longitudinally extending groove 17 of semi-circular cross section, the groove being molded in the rear face 6 of the body portion 3. The groove is formed intermediate of and parallel with the longitudinal edges of the body portion and the ends of the groove are spaced from the curved ends of the body portion. At one end, the lower end when the thermometer is in operative position fastened on a transparent closure, the groove is enlarged to provide a circular cavity 19 which is in communication with the groove. Longitudinally extending walls 21 may be formed along each side of the groove to project upwardly or rearwardly from surface 6 and a circular wall 23 may be formed about the cavity 19, the circular wall being a continuation of walls 21.

Extending forwardly from front surface 4 of body portion 3 is a longitudinally extending magnifying lens 25 molded integral with the base portion and constituting a thickened plastic length having a curved external surface to provide the desired magnification. The lens 25 is aligned with the groove 17 and at one end is circularly enlarged to provide a bulb 27 which is opposite the cavity 19 at one end of the groove. Molded or otherwise provided on surface 4 is a conventional temperature scale 29 which is provided along each side of lens 25. It will now be recognized that the magnifying lens is positioned on the opposite surface of the base portion from the groove and is in alignment therewith so that the thermometer tube which is mounted in the groove will be magnified for ease of taking a temperature reading.

I mount a conventional glass thermometer 31 in the groove 17. The thermometer may comprise the usual sealed tube having a capillary bore having mercury, colored alcohol, or the like, therein which is affected by temperature changes, rising and falling in the tube. As usual, the thermometer tube has a bulb 33 at one end thereof. The thermometer tube 31 is positioned in groove 17 with bulb 33 in circular cavity 19; however, it is preferable that the bulb of the tube be spaced from the plastic wall of the circular cavity so I therefore make the cavity dimensionally such that the bulb will be suspended therein and not in engagement with the cavity wall. Such construction and arrangement keeps the bulb from being affected by the temperature of the cavity wall. I preferably cement the tube in the groove at or adjacent the top end of the tube and at the lower end of the tube above the bulb.

It will now be recognized that I have provided a mounting means for a thermometer tube which may be molded in one operation forming an integral article providing the supporting flanges, the body, the tube receiving groove and the magnifying means, as well as certain other parts. It will be also apparent that the assembly merely consists in positioning the tube 31 in the groove and cementing it therein. It is to be understood that the tube 31 may be affixed in the groove by means other than cement and the assembled instrument will still fall within the spirit and scope of my invention.

The unit is assembled as described at the place of production and the user may mount it on a windowpane or other suitable and convenient transparent closure for a building opening by merely applying an adhesive to the flanges 13 and 15 and pressing the flanges against the exterior surface of the transparent closure until the whole unit is caused to adhere to the closure. With the unit so mounted the body portion 3 and the magnifying lens 25 will be directed toward the closure and the interior of the building and will be spacedly related to the closure. Thus, a person on the inside of the building may look through the transparent closure and take a temperature reading and, it will be noted, that the magnifying lens will be between the person and the tube 31 regardless of the position of the person on the inside of the building relative to the mounted thermometer.

The thermometer will register the true outside temperature unaffected by the room temperature since there will be a free circulation of air through openings 11 from the outside to the area between base portion 3 and the transparent closure upon which the thermometer is mounted, and warm air will not remain in this area, instead it will rise and flow out through the upper opening while outside air may flow into the area through the lower opening. The temperature tube will also be insulated from the inside air by the magnifying lens.

While I have illustrated the walls 21 and 23 as being relatively high, it is within my contemplation to reduce them or to deepen the groove 17. In other words, the tube receiving means may be varied for different sized tubes without departing from the spirit and scope of my invention. It is also within my contemplation to provide a separate magnifying means which would be cemented or otherwise affixed to body portion 3 opposite groove 17.

I claim:

1. An outside thermometer assembly, including in combination, an elongated base portion formed of a transparent material, an imperforate mounting rim projecting forwardly from each edge of said base portion and adapted to be fixed to a supporting surface to maintain the base portion in spaced relation relative thereto, said base portion being formed on the other side thereof from that from which said rim projects with a longitudinally extending groove intermediate the longitudinal edges of the base portion, and the walls of said groove being imperforate throughout the length thereof and a thermometer tube positioned in said groove and means for fixing said thermometer tube therein, and said base portion having spaced apart air flow apertures therein for ventilating the space enclosed by said mounting rim.

2. An outside thermometer assembly, including in combination, an elongated base portion formed of a transparent material, an imperforate continuous mounting rim projecting forwardly from each edge of said base portion and adapted to be fixed to a transparent building closure in substantially sealed relation with respect thereto to maintain the base portion in spaced relation relative to said transparent building closure and providing an air space defined by said transparent building closure, said rim and said base portion, said base portion being formed on the other side thereof from that from which said rim projects with a longitudinally extending groove intermediate the longitudinal edges of the base portion, the walls of said groove being imperforate throughout their length, said base portion being formed with a cavity therein at one end of said groove for receiving the bulb of a thermometer tube, and a thermometer tube having a bulb at one end, said thermometer tube being fixed in said groove and said bulb being received in said cavity and out of contact with the walls thereof, and means fixing said thermometer tube in said groove, an elongated thickened portion formed integrally with said base portion on the side thereof from which said mounting rim projects and in alignment with said groove and forming a magnifying lens for the thermometer tube and a means insulating said thermometer tube from the air space, wherein a visual reading may be taken from the thermometer tube from the side of said base portion from which said mounting rim projects.

3. An outside thermometer assembly in accordance with claim 2 wherein said base portion is provided with spaced apart air flow apertures therein for ventilating the space enclosed by said mounting rim.

References Cited in the file of this patent

UNITED STATES PATENTS

| 1,590,613 | Benedict | June 29, 1926 |
| 1,641,500 | Paul | Sept. 6, 1927 |
| 2,841,010 | Garrett | July 1, 1958 |